United States Patent
Myers et al.

(10) Patent No.: US 9,200,565 B2
(45) Date of Patent: Dec. 1, 2015

(54) FULL HOOP CASING FOR MIDFRAME OF INDUSTRIAL GAS TURBINE ENGINE

(75) Inventors: Gerald A. Myers, Longwood, FL (US); Richard C. Charron, West Palm Beach, FL (US)

(73) Assignee: Siemens Energy, Inc., Orlando, FL (US)

( * ) Notice: Subject to any disclaimer, the term of this patent is extended or adjusted under 35 U.S.C. 154(b) by 685 days.

(21) Appl. No.: 13/310,855

(22) Filed: Dec. 5, 2011

(65) Prior Publication Data

US 2013/0139523 A1 Jun. 6, 2013

(51) Int. Cl.
*F02C 3/14* (2006.01)
*F01D 25/24* (2006.01)
*F01D 25/28* (2006.01)
*F23R 3/46* (2006.01)

(52) U.S. Cl.
CPC . *F02C 3/14* (2013.01); *F01D 25/24* (2013.01); *F01D 25/243* (2013.01); *F01D 25/285* (2013.01); *F23R 3/46* (2013.01); *F05D 2230/70* (2013.01); *F05D 2230/72* (2013.01)

(58) Field of Classification Search
CPC ..... F01D 25/24; F01D 25/243; F01D 25/285; F02C 3/14; F05D 2230/70; F05D 2230/72; F23R 3/02
USPC ........ 60/39.37, 796, 797, 798, 799, 800, 805; 415/134, 142, 213.1, 220, 223; 244/54; 248/554, 555, 556
See application file for complete search history.

(56) References Cited

U.S. PATENT DOCUMENTS

| | | | |
|---|---|---|---|
| 2,548,886 A * | 4/1951 | Howard | 415/199.5 |
| 4,722,184 A | 2/1988 | Chaplin et al. | |
| 5,354,174 A | 10/1994 | Balkcum et al. | |
| 5,885,056 A | 3/1999 | Goodwin | |
| 6,170,141 B1 * | 1/2001 | Rossway et al. | 29/281.1 |
| 6,385,959 B1 | 5/2002 | Montoya | |
| 6,401,447 B1 * | 6/2002 | Rice et al. | 60/796 |
| 2008/0276621 A1 | 11/2008 | Somonath et al. | |
| 2010/0031673 A1 * | 2/2010 | Maltson | 60/796 |
| 2010/0077719 A1 * | 4/2010 | Wilson et al. | 60/39.37 |
| 2010/0296926 A1 * | 11/2010 | Arase et al. | 415/214.1 |
| 2011/0000080 A1 * | 1/2011 | Arase et al. | 29/700 |

FOREIGN PATENT DOCUMENTS

| | | |
|---|---|---|
| CN | 1598271 A | 3/2005 |
| CN | 1634365 A | 7/2005 |
| CN | 101368513 A | 2/2009 |
| CN | 101981292 A | 2/2011 |
| EP | 1744014 A1 | 1/2007 |
| FR | 2907166 A1 | 4/2008 |
| WO | 9627684 A1 | 9/1996 |

* cited by examiner

Primary Examiner — Craig Kim

(57) ABSTRACT

A can annular industrial gas turbine engine, including: a single-piece rotor shaft spanning a compressor section (82), a combustion section (84), a turbine section (86); and a combustion section casing (10) having a section (28) configured as a full hoop. When the combustion section casing is detached from the engine and moved to a maintenance position to allow access to an interior of the engine, a positioning jig (98) is used to support the compressor section casing (83) and turbine section casing (87).

18 Claims, 1 Drawing Sheet

FULL HOOP CASING FOR MIDFRAME OF INDUSTRIAL GAS TURBINE ENGINE

STATEMENT REGARDING FEDERALLY SPONSORED DEVELOPMENT

Development for this invention was supported in part by Contract No. DE-FC26-05NT42644, awarded by the United States Department of Energy. Accordingly, the United States Government may have certain rights in this invention.

FIELD OF THE INVENTION

The present invention relates to an industrial gas turbine engine outer casing. In particular, this invention relates to a full hoop outer casing for a combustion section of an industrial gas turbine engine.

BACKGROUND OF THE INVENTION

Conventional can-annular industrial gas turbine engines have a rotor shaft that spans the compressor section, the combustion section, and the turbine section, and which is constructed as a single piece. High pressures and temperatures contained by the industrial gas turbine engine outer casing provide motivation to keep the outer casing as small as possible. This leads to outer casing designs that follow the shape of the internal components of the engine. The overall shape of the industrial gas turbine engine, and the fact that the outer casing mimics the overall shape, make it impossible to create a single casing that encloses the entire engine. Consequently, the outer casing is usually an assembly of different casing sections assembled about the engine internal components.

In an industrial gas turbine engine where a single piece rotor shaft spans different engine sections, the casing sections are usually split into an upper half and a lower half to facilitate assembly and disassembly of the engine. Leaving the casing bottom halves assembled while removing the top halves also enables access to interior portions of the engine while providing a structural backbone that holds components of the engine in place during maintenance, such as when only certain internal components may be removed and replaced. As a result, conventional industrial gas turbine engines typically have an upper and lower casing that may roughly correspond to a compressor section of the engine, an upper and lower casing that may roughly correspond to a combustion section, and an upper and lower casing that may roughly correspond to a turbine section.

This configuration yields a horizontal joint where the upper and lower casings meet that runs along each side of the industrial gas turbine engine. Further, a circumferential joint is formed around the engine where axially adjacent casings abut. All joints present an opportunity for leakage leading to less efficient engine performance. Furthermore, casings are thicker where there are joints and thinner where there are no joints, leading to the potential for differential thermal expansion. To mitigate the effect of differential thermal expansion, longer startup and shut down times may be used. Further, differential thermal expansion during any transient temperature changes may cause an ovaling of the casing. This ovaling may be detrimental to internal components which count on a circular shape for the casing for proper performance, such as to maintain a desired blade clearance or for proper seal performance. Further, where the horizontal joint and a circumferential joint meet, a four way joint is formed. Four way joints are particularly challenging with respect to mechanical design considerations.

Current industrial gas turbine engine technology provides a maximum pressure ratio of about 22:1. That is, the compressor compresses air to a maximum of approximately 22 times the pressure of ambient air before the air is delivered to the combustors. The mechanical compression alone increases the temperature of the compressed air to approximately 440° C. Conventional split casings made of steel and within the combustion section, where the highest pressures and temperatures occur, may be near their maximum mechanical capacity when at 22 atmospheres and approximately 440° C. However, industrial gas turbine engines operate more efficiently with greater pressure ratios. Thus, conventional industrial gas turbine engine casing designs may inhibit the progress of industrial gas turbine engine development

BRIEF DESCRIPTION OF THE DRAWINGS

The invention is explained in the following description in view of the drawings that show.

DETAILED DESCRIPTION OF THE INVENTION

Figure 1:
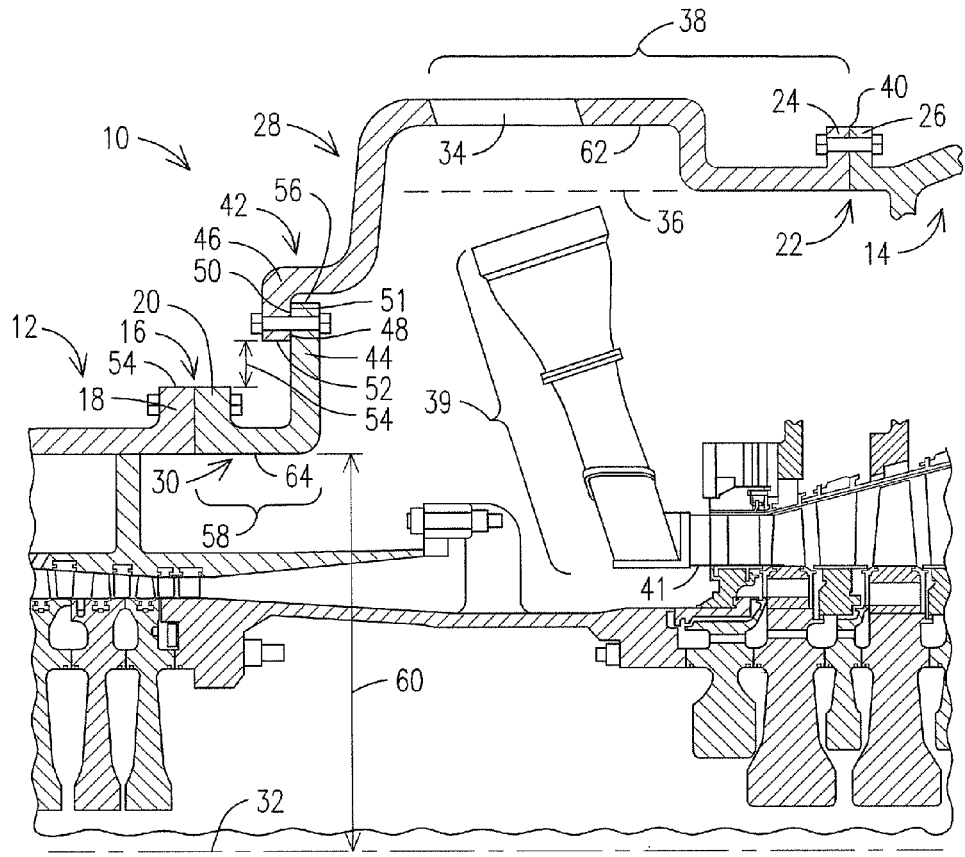
FIG. 1 shows a schematic representation of a partial longitudinal cross section of an embodiment of a combustion section outer casing.

The present inventors have devised an innovative improved outer casing for a can-annular industrial gas turbine engine; i.e. an engine having a single piece rotor shaft that spans a compressor section, a combustion section including a plurality of can combustors, and a turbine section. The combustion section casing includes at least a first section that is configured as a full hoop. There may be a second section that may also be configured as a full hoop, or may be configured as a split casing. A full hoop combustion section outer casing provides many advantages. A full hoop casing has no horizontal joint, reducing the opportunity for leakage and associated reduced operating efficiency of the industrial gas turbine engine. The four way joint of conventional industrial gas turbine engine casing configurations is eliminated, leaving at most a three way joint. A resulting three way joint may possess significantly greater structural resiliency than a four way joint, and thus is a mechanical improvement over the four way joint. Further, a casing configured as a single piece, full hoop, will be able to handle greater hoop (circumferential) stresses. This permits greater design flexibility in the size and shape of the combustion section outer casing, and also permits industrial gas turbine engine designs with a pressure ratio of over 22:1, which is approximately a design limitation of conventional industrial gas turbine engine outer casings. Still further, a full hoop casing avoids the problem of where to place a horizontal joint in industrial gas turbine engines utilizing certain advanced combustion system designs that may place combustors so close together that there may be little room for horizontal joints of conventional design.

With the innovative design, split compressor and turbine casings may remain, and the combustion section casing may be configured such that the compressor and turbine casing sections can be removed in the conventional manner, thereby permitting access to the compressor and turbine for maintenance operations. In an embodiment, the combustion section hoop casing may be axially positionable. For example, the entire combustion section casing or a section of the combustion section casing may be configured such that it can be moved to permit access to the combustion section. The movement may be an axial repositioning from an operating position, where the combustion section casing is attached to the turbine section casing, to a maintenance position forward (upstream with respect to an overall flow of working fluids through the industrial gas turbine engine). In the maintenance position, access to the combustion section is possible.

In some cases a conventional industrial gas turbine engine is supported via a compressor base that supports the compressor outer casing, and a turbine base that supports the turbine outer casing. During maintenance of conventional industrial gas turbine engines, the lower half of the combustion section casing remains in place, and thereby serves as part of a backbone of outer casing lower halves that holds components of the industrial gas turbine engine in relative position with each other. When a combustion section full hoop outer casing is moved from an operating position to a maintenance position, the combustion section casing and the turbine section casing necessarily are disconnected from each other. As a result, the compressor section lower casing, the turbine section lower casing, and associated components would not be held in place with respect to each other. The present inventors have also devised a positioning jig to provide a temporary connection between the compressor section casing and the turbine section casing. The positioning jig could connect to existing attachment points in the casing lower sections when the upper sections are removed, or could connect to dedicated attachment points in either half of the casing sections, or both, or at any other location capable of transferring the necessary mechanical loads.

In addition to a positioning jig, additional supports may be used to provide additional support. This additional support may prevent, for example, either the compressor section or the turbine section from rotation about their respective bases. These additional supports may be in any form appropriate for carrying the desired mechanical loads, including for example simple jacks.

Turning to the drawings, FIG. 1 shows a schematic representation of a partial longitudinal cross section of a combustion section outer casing 10 and portions of an outer casing upper half 12 associated with a compressor section and an outer casing upper half 14 associated with a turbine section in an operating position. The combustion section outer casing 10 may be secured to the compressor section outer casing upper half 12 at a forward interface 16. The forward interface 16 may include a compressor section outer casing upper half aft flange 18 secured to a combustion section outer casing forward flange 20, however other fastening means may be employed. Likewise, the combustion section outer casing 10 may be secured to the turbine section outer casing upper half 14 at an aft interface 22. The aft interface 22 may include a combustion section outer casing aft flange 24 secured to a turbine section outer casing upper half forward flange 26. The embodiment shown permits the compressor section outer casing upper half 12 and/or the turbine section outer casing upper half 14 to be removed in a conventional manner while leaving the combustion section outer casing 10 in place.

In an embodiment, the combustion section outer casing 10 includes a first section 28 and a second section 30. The first section 28 may be disposed adjacent combustors (not shown) and transition ducts (not shown) with respect to a longitudinal axis 32 of the industrial gas turbine engine which is the axis of rotation of the engine shaft (not shown). The first section 28 may entirely enclose the combustors and transition ducts, or the first section 28 may include combustor openings 34 through which combustors may extend once the industrial gas turbine engine is fully assembled. These combustor openings 34 may be angled with respect to the longitudinal axis 32 and/or angled with lines extending radially (not shown) from the longitudinal axis 32. In an embodiment, the combustors may be secured to the combustion section outer casing 10.

In an embodiment, the transition ducts may lie entirely radially inward of radial clearance line 36. In embodiments where the transition ducts are positioned within the radial clearance line 36, the first section 28 is free to move axially forward with respect to the engine from the operational position as shown, to a maintenance position. This is possible because the radially extreme portion 38 of the first section that includes the combustor openings 34 downstream to a downstream end 40 of the combustion section outer casing 10 would be able to clear the transition ducts radially.

Embodiments like this may be used in emerging can annular industrial gas turbine engine technology that employs advanced transitions 39, where the advanced transitions are configured to properly orient and accelerate combustion gases received from a respective combustor and deliver them directly onto a first row of turbine blades. In these designs, the advanced transition may deliver the combustion gases tangentially to the turbine inlet annulus (not shown). As a result, the conventional first row turbine guide vanes typically used to orient and accelerate combustion gases are no longer needed. The advanced transition ducts may then be supported by the turbine vane carrier 41 (shown schematically) which would no longer need to support the first row of turbine vanes. Since the advanced transitions are supported by structure unrelated to the combustion section outer casing 10, the combustion section outer casing 10 is free to move to the maintenance position without removing the advanced transitions. This represents a reduction in maintenance costs when the combustion section outer casing 10 must be moved to access other parts of the combustion section. However, the combustor openings 34 may be configured (e.g. large enough) to permit an advanced transition to be removed through the combustor openings 34 without having to move the first section 28 to the maintenance position.

In embodiments including a second section 30, the second section 30 may be disposed between the first section 28 and the compressor section casing upper half 12 and a compressor section casing lower half (not shown). The second section 30 may be configured as a split ring or a full hoop. In instances where the second section 30 is configured as a split ring, it may be removed in a manner similar to other split rings, or it may simply remain in place. In instances when the second section 30 is configured as a full hoop, it cannot be removed unless the rotor shaft is also removed. In the configuration shown in FIG. 1, a combustion section outer casing 10 includes an integral interface 42. At the integral interface 42, an aft end 44 of the second section 30 interfaces with a fore end 46 of the first section 28. In particular, in the embodiment shown, a radially oriented, annular shaped first section surface 48 abuts a radially oriented, annular shaped second section surface 50 when the first section 28 is in the operating position. This abutment forms an annular seal 51, and together with the abutment at the aft interface 22, defines the operating position for the first section 28. In order for the first section 28 to move from the operation position (to the left in the figure) it is clear that a most radially inward surface 52 of the second section 30 must clear the most radially outward surface 54 of the compressor section outer casing upper half 12 and the compressor section outer casing lower half (not shown) by a clearance amount 54, at least to the extent of axially overlapping portions of the combustion section outer casing 10 and the compressor section outer casing halves when in the maintenance position. Likewise, a most radially outward surface 56 of the aft end 44 must be disposed so as to clear the first section 28 when the first section 28 is moved from the maintenance position.

It can also be seen in the illustrated embodiment that the second section 30 includes an axially extending portion 58. The axially extending portion 58 extends more or less parallel to the industrial gas turbine engine longitudinal axis 32 from the compressor section outer casing. This is done to minimize a longitudinal profile of a radius 60 of an inner surface 62 of the second section 30 and an inner surface 64 of the first section 28, which in turn decreases an amount of area of the first section 28 and the second section 30 exposed to the pressure of the compressed air within the engine. By minimizing the amount of surface area exposed to the elevated pressure, forces exerted by the compressed air on the first section 28 and the second section 30 are minimized, and this permits minimizing a structural bulk of these sections. Portions of the first section 28 with a larger radius 60 exist for purposes of clearing the aft end 44 of the second section 30, and thus are incorporated and are designed to accommodate the increased forces resulting from the increased radius 60.

Figure 2:
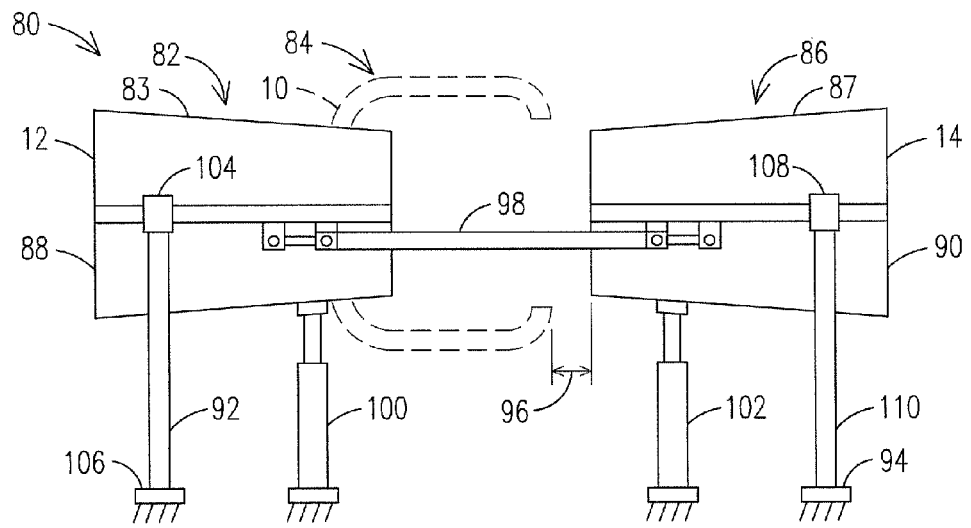
FIG. 2 shows a schematic representation of an industrial gas turbine engine incorporating an embodiment of the combustion section outer casing.

FIG. 2 schematically depicts an industrial gas turbine engine 80 including a compressor section 82 incorporating a compressor section outer casing 83, a combustion section 84, and a turbine section 86 incorporating a turbine section outer casing 87. The compressor section outer casing 83 includes the compressor section outer casing upper half 12 and a compressor section outer casing lower half 88. The combustion section 84 includes a combustion section outer casing 10, which is shown in a maintenance position. The turbine section outer casing 87 includes the turbine section outer casing upper half 14 and a turbine section outer casing lower half 90. The embodiment of FIG. 2 shows a single piece combustion section outer casing 10. In a multi piece embodiment such as in FIG. 1, the second section 30 would remain in place and only the first section 28 would be moved forward as depicted in FIG. 2.

Also shown are a compressor section base 92 configured to support the compressor section 82 and a turbine section base 94 configured to support the turbine section 86. In a conventional industrial gas turbine engine 80 there may be no other supports and thus a conventional combustion section outer casing lower half (not shown) must be secured between and to the compressor section outer casing lower half 88 and the turbine section outer casing lower half 90 in order to hold the assembly in place. However, with the present invention, when the combustion section outer casing 10 is in the maintenance position, gap 96 is formed between the compressor section outer casing lower half 88 and the turbine section outer casing lower half 90. Consequently, a positioning jig 98 may be implemented in order to hold the assembly in place when the combustion section outer casing 10 is in the maintenance position. The positioning jig 98 may span a length of the industrial gas turbine engine 80 to secure the compressor section 82 in position relative to the turbine section 86. The positioning jig 98 may be connected by any means known to those of ordinary skill in the art, including by fastening into existing flange connection points etc. The positioning jig 98 then prevents relative movement of the compressor section 82 and/or the turbine section 86 along the industrial gas turbine engine longitudinal axis 32.

In addition to positioning jigs 98, additional supports may be utilized to prevent other relative movement. For example, a compressor section additional support 100 may provide additional support for the compressor section 82, and a turbine section additional support 102 may likewise provide additional support for the turbine section 86. Without the compressor section additional support 100, gravity may urge the compressor section 82 to rotate about a compressor section base connection point 104 where the compressor section base 92 connects to the compressor section 82, or to rotate about a compressor section base grounding point 106 where the compressor section base 92 connects to the ground, or both. Such rotation may at a minimum disturb a positioning of the compressor section 82 relative to the turbine section 86. The supports may take any form known to those of ordinary skill in the art, including but not limited to jacks etc.

Likewise, without the turbine section additional support 102, gravity may urge the turbine section 86 to rotate about the a turbine section base connection point 108 where the turbine section base 94 connects to the turbine section 86, or to rotate about a turbine section base grounding point 110 where the turbine section base 94 connects to the ground, or both. Such rotation may at a minimum disturb a positioning of the turbine section 86 relative to the compressor section 82. Installing the compressor section additional support 100 and the turbine section additional support 102 may prevent such tendency for a section to rotate, and thus provide rotational stability in addition to the axial stability provided by the positioning jig 98. The axial stability together with the rotational stability will suffice to hold the compressor section 82 and the turbine section 86 in position relative to each other when the combustion section outer casing 10 not connected to either in an operating position, but is instead in a maintenance position. Maintenance operations are thus made more secure with minimal additional effort.

It has been shown that the innovative hoop structure combustion section casing 10 provides a stronger casing that may permit higher pressure of compressed air, which may in turn allow for more efficient industrial gas turbine engine designs. Further, the design may reduce leakage and may permit combustion section casings of lighter design due to the increased structural strength. The combustion section casing design also allows for easy maintenance of combustion section components in an operating position and may include additional positioning components that enable the combustion section casing to be moved to a maintenance position where even greater access to the combustion system components is realized, while still maintaining the compressor and turbine sections in a fixed relative position. Consequently, the design disclosed herein represents an improvement in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A can annular industrial gas turbine engine, comprising:
a single-piece rotor shaft spanning a compressor section, a combustion section, and a turbine section; and
a combustion section outer casing comprising: a first section comprising a single piece annular body configured to connect to a turbine section casing; a discrete second section disposed between the first section and a compressor section casing; and an annular joint formed between a radially oriented aftward-facing annular surface of the first section and a radially oriented forward-facing annular surface of the second section.

2. The can annular industrial gas turbine engine of claim 1, wherein while the second section is secured to the compressor section casing the first section is configured to move axially forward over the second section toward the compressor section and along a longitudinal axis of the can annular industrial gas turbine engine from an operating position, where the first section is secured to the turbine section casing, to a maintenance position forward of the operating position when the first section is detached from the turbine section casing.

3. The can annular industrial gas turbine engine of claim 2, wherein the second section comprises a single piece annular body.

4. The can annular industrial gas turbine engine of claim 2, wherein the first section comprises a plurality of combustor openings through which respective combustors extend when in the operating position.

5. The can annular industrial gas turbine engine of claim 4, further comprising advanced transition ducts configured to orient and accelerate combustion gas from a respective combustor directly onto a first row of turbine blades without traversing guide vanes, wherein the advanced transition ducts are not supported by the combustor section outer casing, and wherein the combustor openings are configured to enable removal of a respective advanced transition duct there through.

6. The can annular industrial gas turbine engine of claim 4, further comprising advanced transition ducts configured to orient and accelerate combustion gas from a respective combustor directly onto a first row of turbine blades without traversing guide vanes, wherein the advanced transition ducts are not supported by the combustor section outer casing,
wherein a portion of the first section comprising the combustor openings and everything downstream thereof is disposed radially outward of the advanced transition ducts.

7. The can annular industrial gas turbine engine of claim 2, wherein an entirety of the first section is disposed radially outward of the compressor section casing.

8. The can annular industrial gas turbine engine of claim 2, further comprising a positioning jig configured to hold the compressor section casing and the turbine section casing in position relative to each other when the first section is not in the operating position.

9. The can annular industrial gas turbine engine of claim 8, further comprising a compressor section casing support configured to hold the compressor section casing in place when the first section is not in the operating position, and a turbine section casing support configured to hold the turbine section casing in place when the first section is not in the operating position.

10. A can annular industrial gas turbine engine combustion section casing, comprising:
a monolithic first section configured as to fully surround the combustor and comprising a turbine end flange configured to be secured to a turbine casing flange; and
a discrete second section comprising a compressor end flange configured to be secured to a compressor casing flange,
wherein when in an operating position, the first section and the second section share a common longitudinal axis and form an annular seal there between where a radially oriented aftward-facing annular surface of the first section abuts with a radially oriented forward-facing annular surface of the second section, and
wherein aftward movement of the first section from the operating position along the common longitudinal axis is prevented by the radially oriented forward-facing annular surface of the first section.

11. The can annular industrial gas turbine engine combustion section casing of claim 10, further comprising a plurality of combustor openings formed in the first section.

12. A can annular industrial gas turbine engine comprising the combustion section casing of claim 10.

13. A can annular industrial gas turbine engine, comprising:
a single-piece rotor shaft spanning a compressor section, a combustion section, and a turbine section;
an array of advanced transition ducts configured to orient and accelerate combustion gas from a respective combustor directly onto a first row of turbine blades without traversing guide vanes;
a compressor section casing;
a turbine section casing; and
a combustion section casing comprising a first section comprising a single piece annular body configured to connect to the turbine section casing and a discrete second section configured to connect to the first section and to the compressor section casing, the combustion section comprising an annular shaped joint between a radially oriented aftward-facing annular surface of the first section and a radially oriented forward-facing annular surface of the second section, wherein while the second section is secured to the compressor section casing a position of the first section is axially adjustable within a range of positions over the second section and along a longitudinal axis of the industrial gas turbine engine, and wherein the range of positions comprises an operating position where the first section is secured to the turbine section casing and a maintenance position where the first section is detached from the turbine section casing and moved forward toward the compressor section.

14. The can annular industrial gas turbine engine of claim 13, wherein the first section comprises a plurality of apertures through which respective combustors extend when the first section is in the operating position.

15. The can annular industrial gas turbine engine of claim 14, wherein an entirety of the first section adjacent or downstream of the advanced transition ducts is disposed radially outward of the advanced transition ducts so that the first section is axially movable along the range of positions when the advanced transition ducts are installed in the can annular industrial gas turbine engine.

16. The can annular industrial gas turbine engine of claim 14, wherein an entirety of the first section is disposed radially outward of the compressor section casing so that the first section is axially movable along the range of positions.

17. The can annular industrial gas turbine engine of claim 13, further comprising a positioning jig configured to hold the compressor section casing and the turbine section casing in place relative to each other when the first section is not in the operating position.

18. The can annular industrial gas turbine engine of claim 13, further comprising a compressor section casing support to hold the compressor section casing in place when the first section is not in the operating position, and a turbine section casing support to hold the turbine section casing in place when the first section is not in the operating position.

\* \* \* \* \*